United States Patent [19]

Takahashi et al.

[11] Patent Number: 4,842,354
[45] Date of Patent: Jun. 27, 1989

[54] ROTARY POLYGONAL MIRROR AND METHOD OF MAKING THE SAME

[75] Inventors: Kimio Takahashi, Machida; Norihisa Saito, Tokyo, both of Japan

[73] Assignee: Canon Kabushiki Kaisha, Tokyo, Japan

[21] Appl. No.: 831,835

[22] Filed: Feb. 24, 1986

[30] Foreign Application Priority Data

Feb. 27, 1985 [JP] Japan ................. 60-036457
Feb. 27, 1985 [JP] Japan ................. 60-036458

[51] Int. Cl.$^4$ ............................................. G02B 26/10
[52] U.S. Cl. ..................... 350/6.8; 350/6.7; 350/616; 350/320
[58] Field of Search ................ 350/320, 6.8, 6.7, 609, 350/616; 156/258, 268, 293, 294; 427/166, 214, 215, 222

[56] References Cited

U.S. PATENT DOCUMENTS

| 4,101,365 | 7/1978 | Fisli | 350/6.8 |
| 4,205,100 | 5/1980 | Fisli | 350/6.8 |
| 4,277,141 | 7/1981 | Kleiber | 350/316 |
| 4,340,646 | 7/1982 | Ohno et al. | 350/320 |
| 4,592,622 | 6/1986 | Hashimoto et al. | 350/6.8 |
| 4,623,216 | 11/1986 | Sato et al. | 350/6.8 |
| 4,643,518 | 2/1987 | Taniguchi | 350/6.8 |

FOREIGN PATENT DOCUMENTS

| 56-110904 | 2/1981 | Japan . | |
| 57-29004 | 2/1982 | Japan | 350/6.7 |

Primary Examiner—Bruce Y. Arnold
Assistant Examiner—Loha Ben
Attorney, Agent, or Firm—Fitzpatrick, Cella, Harper & Scinto

[57] ABSTRACT

A rotary polygonal mirror has a base member with a portion of a polygonal cross-section constructed of such a relatively light-weight material as can easily be formed into a relatively complicated configuration. The polygonal portion includes a reflective mirror face formed on one or more sidewalls thereof. A method of making such rotary polygonal mirror includes the step of molding the base member with or without subjecting one or more sidewalls of the polygonal portion to a precision cutting to form a reflective mirror face thereon.

6 Claims, 1 Drawing Sheet

ROTARY POLYGONAL MIRROR AND METHOD OF MAKING THE SAME

BACKGROUND OF THE INVENTION

1. Field of the Invention

The present invention relates to a rotary polygonal mirror suitable for use in laser scanning systems and other optical systems and a method of making such a polyhedral mirror.

2. RELATED BACKGROUND ART

The rotary polygonal mirror is mounted in an optical system of the laser scanner, for example, such that a path of laser beam will be changed for causing the laser beam spot to scan a light receiving surface. A rotary polygonal mirror is typically known which is of an equilaterally polygonal cross-section such as a regular hexagon with all the sidewalls thereof being reflective.

Such a rotary polygonal mirror is conventionally produced by forming a body of optical glass into an equilateral polygonal member through grinding polishing and other steps and finally polishing the sidewalls of the member to provide reflective mirror faces, or alternatively by first cutting an equilateral polygonal member from a material of metal such as aluminum alloy and the like and then subjecting the member to an ultra-precision machining to form reflective sidewalls by the use of a diamond cutting tool.

However, the aforementioned processes of making the rotary polygonal mirror have a great number of steps and particularly require an increased amount of labor and time. Moreover, the process requires a high degree of technology in cutting mirror blanks from the optical glass or metallic material and forming them into rotary polygonal mirrors having accurately reflective side faces through grinding, polishing and other machining operations. Further, if a rotary polygonal mirror having a complicated configuration other than its reflective mirror faces is to be formed, even more complicated technology and greater number of steps are required leading to increased cost of manufacturing.

Another problem also exists when a heavy material such as optical glass or metal is to be used to form a mirror blank, i.e., the entire weight of a rotary polygonal mirror constructed of such a mirror blank cannot be decreased as desired.

SUMMARY OF THE INVENTION

It is therefore an object of the present invention to provide a rotary polygonal mirror which can more easily be produced with a decreased cost and a method of making such a rotary polygonal mirror.

Another object of the present invention is to provide a rotary polygonal mirror having a reduced weight and a method of making such a rotary polygonal mirror.

Still another object of the present invention is to provide a method capable of more easily forming a rotary polygonal mirror having a complicated configuration other than its reflective side faces with a reduced cost of manufacturing.

In order to accomplish these objects, the present invention provides a rotary polygonal mirror comprising a base member with a portion of a polygonal cross-section constructed of such a relatively light-weight material as can easily be formed into a relatively complicated configuration, the base member including a reflective mirror face formed thereon at one or more sidewalls thereof. The present invention also provides a method of making such a rotary polygonal mirror, comprising the steps of forming a base member with a portion of a polygonal cross-section from the material and subjecting one or more sidewalls of the portion of the base member to a precision cutting to form a reflective mirror face.

The present invention further provides a method of making such a rotary polygonal mirror, comprising the step of forming a base member with a portion of a polygonal cross-section with its sidewalls being formed into reflective mirror faces by molding the material.

DETAILED DESCRIPTION OF PREFERRED EMBODIMENT

Figure 1:
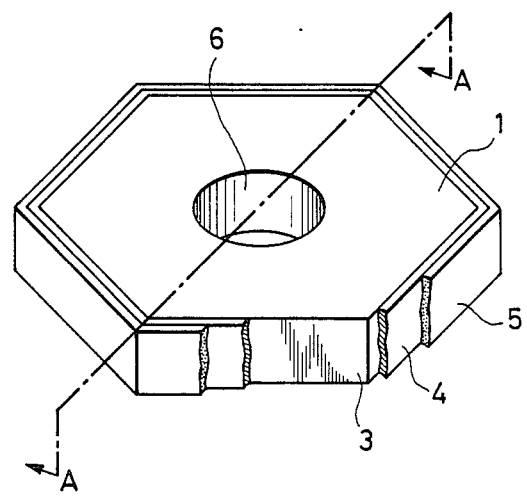
FIG. 1 is a schematic and perspective view, partially broken, of one embodiment of a rotary polygonal mirror constructed in accordance with the present invention.
Figure 2:
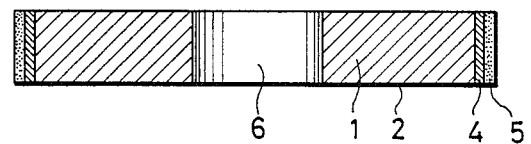
FIG. 2 is a cross-sectional view of the rotary polygonal mirror taken along a line A—A in FIG. 1.

The present invention will now be described in more detail in connection with a rotary polygonal mirror having an equilateral hexagon cross-section with reference to the drawings.

Referring to the drawings, there is shown a first embodiment of the present invention basically comprising a base member 1 having reflective mirror faces 3 formed on the sidewalls of the base member 1, a reflection intensifying film 4 formed over the reflective mirror faces 3 and a protective film 5 formed over the reflection intensifying film 4.

The base member 1 has an equilateral hexagon cross-section and, in the illustrated embodiment, includes a central opening 6 formed therethrough which can be used to mount the rotary polygonal mirror on a scanner. The base member 1 also includes a bottom functioning as a mounting reference surface 2 which can be used to position the rotary polygonal mirror within the scanner. However, the positions and shapes of the opening 6 and the reference surface, 2 may optionally be selected depending on various forms of scanners to be used. Furthermore, the cross-sectional shape of the base member 1 is not limited to the equilateral hexagon but may be formed into any one of various polygonal cross-sections as desired. Moreover, the portions of the base member 1 other than the reflective sidewalls thereof may optionally be formed into any one of various shapes depending on various forms of scanners to be used.

The base member 1 is molded from any one of a number of plastic materials and composite plastic materials which main component consists of plastic material, which can be formed into any desired shape in a mold and provides the mechanical strength required when the rotary polygonal mirror is actually used. If it is desired to reduce the weight of the rotary polygonal mirror, it is preferred to use a material having less weight. Such materials include plastic materials such as PMMA, ABS, polycarbonate and others and composite materials produced by combining any one of these plastic materials with other materials such as glass fibers, carbon fibers or the like.

Each of the reflective mirror faces 3 has such shape and surface precision as to provide a necessary reflecting function and positioned relative to the reference surface 2 in a predetermined relationship with the latter.

In order to obtain the necessary positions of the reflective mirror faces 3 within the scanner, the sidewalls of the base member 1 are subjected to a precision machining operation. In connection with this, the reference surface 2 also is carefully machined to have a necessary shape and surface precision.

The film 4 serves as reflection intensifying means for intensifying the reflection of the reflective mirror faces 3. The film 5 functions as protective means for mainly protecting the reflection intensifying film 4.

In addition to the protective function, the protective film 5 must not disturb at least the reflecting function of the reflective mirror faces 3.

It is more preferred that the protective film 5 is formed from a material capable of increasing the reflection factor of the reflective mirror faces 3. The films 4 and 5 over the reflective mirror faces 3 may either be single-layered or multi-layered so far as they can perform the desired functions. Furthermore, each of the films 4 and 5 may optionally be formed from any one or combination of various suitable materials to increase the strength, humidity-resistance, environmental resistance and other properties in the base member. Moreover, the films 4 and 5 may be provided on the portions of the base member other than the reflective mirror faces, if desired.

Materials usable to form the reflection intensifying film 4 include metals such as Cu, Al, Au, Ag and others while the protective and reflection intensifying film 5 can be formed of any one of materials such as SiO, $MgF_2$, $CeO_2$ and others.

The rotary polygonal mirror according to the first embodiment of the present invention may be constructed as follows:

First of all, any one of the aforementioned materials is formed into a base member 1 of the desired configuration by the use of any suitable forming process utilizing a mold, such as injection molding, compression molding, casting or the like.

If the formed base member 1 cannot be produced with the desired precision only by the use of the mold, the base member 1 can then be precisely machined at its portions corresponding to the reflective mirror faces 3 and reference surface 2 to obtain the desired configuration and surface precision of the base member 1. At the same time, the reflective mirror faces 3 are properly positioned relative to the reference surface 2 in the aforementioned relationship therebetween.

The precision machining mentioned above may include any suitable machining process, for example, an ultra-precision cutting process which utilizes a diamond cutting tool.

The reflective mirror faces 3 on the base member 1 is then coated with a reflection intensifying film 4 which is formed of any one of the aforementioned materials through any suitable film forming process such as vapor deposition, ion plating, sputtering or the like. The reflection intensifying film 4 has a thickness which is normally in the range of 0.05 $\mu$m–0.2 $\mu$m.

A protective and reflection intensifying film 5 is finally formed over the reflection instensifying film 4 by forming it from any one of the aforementioned materials through any suitable film forming process such as vapor deposition, ion plating, sputtering or the like. The thickness of the film 5 is normally in the range of 0.02 $\mu$m–0.1 $\mu$m.

The present invention will be described with reference to its second embodiment which comprises a base member 1 molded by the use of a mold to have reflective mirror faces 3, a central through-opening 6 and a mounting reference surface 2.

The second embodiment requires such a material as can be formed more precisely or molded into the base member of the desired configuration, precision and dimensions.

More particularly, when the base member 1 is molded within the mold, the reflective mirror faces 3 are simultaneously molded by the corresponding faces of the same mold such that the mirror faces 3 will have their shapes and surface precision necessary to obtain the desired reflecting function, will be accurately positioned relative to the mounting reference surface 2 and can be properly mounted within a scanner in place. The mounting reference surface 2 also is simultaneously molded to have its desired configuration and surface precision.

Reflection intensifying film 4 and protective film 5 are formed in the same manner as that of the first embodiment.

A rotary polygonal mirror according to the second embodiment of the present invention is formed as follows:

First of all, the base member 1 is formed into the desired configuration from any one of the aforementioned materials by the use of any suitable forming process utilizing mold means, such as injection molding, compression molding, casting or the like. At the same time, the reflective mirror faces 3 and the mounting reference surface 2 are molded to have their desired configurations and surface precisions in addition to the aforementioned positional relationship therebetween. Therefore, the mold used herein must have its configurations, surface precision of the faces 3 and 2.

Thereafter, the reflection intensifying film 4 and the protective film 5 are formed on the base member 1 in the same manner as that of the first embodiment.

As will be appreciated from the foregoing, the present invention can extremely decrease the number of working steps in making a rotary polygonal mirror, leading to the reduction of manufacturing costs because the present invention does not require grinding, polishing and other operations as in the prior art.

Since the base member can be molded from any one of the plastic materials by the use of mold means, the rotary polygonal mirror can easily have the desired configuration. Even if the portions of the mirror other than its reflective mirror faces are of complicated shapes, the rotary polygonal mirror can easily and simply be formed in accordance with the method of the present invention.

Since the rotary polygonal mirror of the present invention has its primary parts formed from any relatively light-weight material, that is, a plastic material or a composite plastic material, the entire weight of the rotary polygonal mirror can be reduced up to about 50%–60% of that the similar mirrors which were formed from optical glass or metal material according to the prior art.

What is claimed is:

1. A rotary polygonal mirror for use in a scanner or the like, comprising:
    a base member with a portion of a polygonal cross-section, said base member being wholly formed of one of a number of plastic materials and composite plastic materials whose main component consists of a plastic material, and having a bottom surface and sidewalls;

a reflective mirror face formed on one or more sidewalls of said portion by means of a precision cutting operation; and a mounting reference surface for positioning the polygonal mirror within the scanner, said reference surface being formed on the bottom surface of said portion by means of a precision cutting operation.

2. A rotary polygonal mirror as defined in claim 1, further comprising a reflection intensifying film formed on said reflective mirror face.

3. A rotary polygonal mirror as defined in claim 2, further comprising a protective film formed on said reflection intensifying film.

4. A method of making a rotary polygonal mirror for use in a scanner or the like, said method comprising the steps of:

molding a base member with a portion of a polygonal cross-section from one of a number of plastic materials and composite plastic materials whose main component consists of a plastic material;

precision cutting one or more sidewalls of said portion to form a reflective mirror face thereon; and precision cutting a bottom surface of said portion to form a mounting reference surface for positioning the polygonal mirror within the scanner.

5. A method as defined in claim 4, further comprising the step of forming a reflection intensifying film on said reflective mirror face.

6. A method as defined in claim 5, further comprising the step of forming a protective film on said reflection intensifying film.

* * * * *

UNITED STATES PATENT AND TRADEMARK OFFICE
CERTIFICATE OF CORRECTION

PATENT NO. : 4,842,354

DATED : June 27, 1989

INVENTOR(S) : Takahashi, et al.

It is certified that error appears in the above-identified patent and that said Letters Patent is hereby corrected as shown below:

COLUMN 1:

Line 17, "equilaterally" should read --equilateral--.

Line 21, "grinding" should read --grinding,--.

Line 24, "natively" should read --natively,--.

COLUMN 2:

Line 42, "surface, 2" should read --surface 2--.

Line 54, "which" should read --whose--.

Line 67, "positioned" should read --is positioned--.

COLUMN 3:

Line 53, "is" should read --are--.

UNITED STATES PATENT AND TRADEMARK OFFICE
CERTIFICATE OF CORRECTION

PATENT NO.   :   4,842,354

DATED        :   June 27, 1989

INVENTOR(S)  :   Takahashi, et al.

It is certified that error appears in the above-identified patent and that said Letters Patent is hereby corrected as shown below:

COLUMN 4:

Line 40, "extremely" should read --greatly--.

Line 59, "of that" should read --that of--.

Signed and Sealed this

Sixteenth Day of October, 1990

Attest:

HARRY F. MANBECK, JR.

*Attesting Officer*   Commissioner of Patents and Trademarks